US010464056B2

(12) United States Patent
Stengel

(10) Patent No.: US 10,464,056 B2
(45) Date of Patent: Nov. 5, 2019

(54) LATENT CATALYST FOR THE PRODUCTION OF POLYURETHANE FOAM

(71) Applicant: Momentive Performance Materials Inc., Waterford, NY (US)

(72) Inventor: Jason Stengel, Williamstown, WV (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 129 days.

(21) Appl. No.: 15/502,306

(22) PCT Filed: Jul. 21, 2015

(86) PCT No.: PCT/US2015/041294
§ 371 (c)(1),
(2) Date: Feb. 7, 2017

(87) PCT Pub. No.: WO2016/039856
PCT Pub. Date: Mar. 17, 2016

(65) Prior Publication Data
US 2017/0225158 A1    Aug. 10, 2017

Related U.S. Application Data

(60) Provisional application No. 62/049,797, filed on Sep. 12, 2014.

(51) Int. Cl.
| | | |
|---|---|---|
| C08G 18/16 | (2006.01) | |
| B01J 31/26 | (2006.01) | |
| C08G 18/65 | (2006.01) | |
| C08G 18/08 | (2006.01) | |
| C08G 18/22 | (2006.01) | |
| C08G 18/66 | (2006.01) | |
| C08G 18/32 | (2006.01) | |
| C08G 18/40 | (2006.01) | |
| C08G 18/48 | (2006.01) | |
| C08G 18/76 | (2006.01) | |
| C08G 18/18 | (2006.01) | |
| C08G 101/00 | (2006.01) | |
| B01J 31/02 | (2006.01) | |
| B01J 31/22 | (2006.01) | |

(52) U.S. Cl.
CPC .............. *B01J 31/26* (2013.01); *C08G 18/08* (2013.01); *C08G 18/163* (2013.01); *C08G 18/18* (2013.01); *C08G 18/22* (2013.01); *C08G 18/222* (2013.01); *C08G 18/3206* (2013.01); *C08G 18/4072* (2013.01); *C08G 18/4804* (2013.01); *C08G 18/65* (2013.01); *C08G 18/6674* (2013.01); *C08G 18/7671* (2013.01); *B01J 31/0237* (2013.01); *B01J 31/2234* (2013.01); *B01J 2531/16* (2013.01); *C08G 2101/00* (2013.01)

(58) Field of Classification Search
CPC .... B01J 31/0237; B01J 31/2234; B01J 31/26; B01J 2531/16; C08G 18/08; C08G 18/163; C08G 18/18; C08G 18/22; C08G 18/222; C08G 18/3206; C08G 18/4072; C08G 18/4804; C08G 18/65; C08G 18/6674; C08G 18/7671; C08G 2101/00
See application file for complete search history.

(56) References Cited

U.S. PATENT DOCUMENTS

| | | | |
|---|---|---|---|
| 3,061,557 A | 10/1962 | Hostettier | |
| 3,084,177 A | 4/1963 | Hostettier | |
| 3,870,578 A | 3/1975 | Nichols, Jr. | |
| 3,892,715 A | 7/1975 | Bonin et al. | |
| 3,920,587 A * | 11/1975 | Watkinson | ............. C08G 18/48 521/111 |
| 4,115,301 A * | 9/1978 | Kennedy | ................. C08G 18/10 521/155 |
| 4,151,345 A | 4/1979 | Hillegass | |
| 4,263,423 A | 4/1981 | Schwindt et al. | |
| 4,275,172 A | 6/1981 | Barth et al. | |
| 4,395,528 A | 7/1983 | Leiner et al. | |
| 4,546,034 A | 10/1985 | Frentzel | |
| 4,598,136 A | 7/1986 | Wick | |
| 5,733,945 A | 3/1998 | Simpson | |
| 2008/0073622 A1 | 3/2008 | Housel | |
| 2010/0234482 A1 | 9/2010 | Du Prez et al. | |

(Continued)

FOREIGN PATENT DOCUMENTS

| | | |
|---|---|---|
| JP | S5650919 | 5/1981 |
| JP | H1180219 | 3/1999 |

(Continued)

OTHER PUBLICATIONS

Patent Cooperation Treaty (PCT), International Search Report and Written Opinion for Application PCT/US2015/041294 filed Jul. 21, 2015, dated Oct. 28, 2015, International Searching Authority, US.
M. P. Gafurova et al., "Mechanism of Catalysis by Ferric Acetylacetonate of the Reaction Between Isocyanates and Hydroxbutadiene Oligomers" Polymer Science U.S.S.R., vol. 28, No. 8, pp. 1945-1951 (1986).
David Ihms et al., "Effect of Catalysts on the Kinetics of the Water-Toluene Diisocyanate Reaction" Journal of Coatings Technology, vol. 57, No. 722 (1985).
E.P. Kohler et al., "An Apparatus for Determining Both the Quantity of Gas Evolved and the Amount of Reagent Consumed in Reactions with Methyl Magnesium Iodide" J. Am. Chem. Soc., vol. 49, No. 12, pp. 3181 (1927).

*Primary Examiner* — John M Cooney
(74) *Attorney, Agent, or Firm* — McDonald Hopkins LLC; Joseph Waters

(57) ABSTRACT

The present technology provides a foam-forming composition comprising at least one polyol, at least one isocyanate, at least one copper catalyst composition, and at least one surfactant. The copper catalyst composition may comprise a copper (II) compound dissolved in a solvent. In one embodiment, the copper catalyst composition comprises (Cu(II) (acac)$_2$) dissolved in DMSO.

16 Claims, 9 Drawing Sheets

(56) References Cited

U.S. PATENT DOCUMENTS

2012/0183622 A1     7/2012   Guelcher et al.
2013/0102694 A1     4/2013   Keaton et al.

FOREIGN PATENT DOCUMENTS

| JP | 200745980 | 2/2007 |
| JP | 2012144679 | 8/2012 |

* cited by examiner

LATENT CATALYST FOR THE PRODUCTION OF POLYURETHANE FOAM

CROSS REFERENCE TO RELATED APPLICATIONS

The present application claims priority to and the benefit of International Patent Application No. PCT/US2015/041294 titled "LATENT CATALYST FOR THE PRODUCTION OF POLYURETHANE FOAM," filed on Jul. 21, 2015, which claims priority to U.S. Provisional Application No. 62/049,797 titled "LATENT CATALYST FOR THE PRODUCTION OF POLYURETHANE FOAM," filed on Sep. 12, 2014, the disclosure of which is incorporated herein by reference in its entirety.

FIELD

The present technology relates to polyurethane foam-forming compositions. More specifically, the present technology provides for the production of polyurethane foam with a latent cure catalyst having a lower toxicity than conventional catalysts.

BACKGROUND

A resilient foam may be formed by utilizing polyurethane foam-forming compositions incorporating an isocyanate and a high molecular weight polyol is known. Nickel-based compositions have been employed and are widely accepted as catalysts in manufacturing polyurethane foam. Nickel, however, is a well-known carcinogen and there are significant health risks associated with its use. Therefore, there is a movement in the industry to reduce or minimize the amount of nickel-based catalysts used in producing polyurethane foams. While such a goal is desirable, other catalysts, including other metal catalysts, are limited in their use. Such alternative catalysts may be limited by, for example, their solubility in the system and/or tunable reactivity of the catalyst.

SUMMARY

The present technology provides a foam-forming composition comprising at least one polyol, at least one isocyanate, at least one catalyst composition, and at least one surfactant.

In one embodiment, the copper catalyst composition comprises a copper (II) compound dissolved in a solvent.

The foam forming composition of any of the previous embodiments where the copper (II) compound comprises copper (II) coordinated to a ligand chosen from a carboxylate, a diketonate, a salicylate, an organic salt, a halide, or a combination of two or more thereof.

The foam forming composition of any of the previous embodiments where the copper catalyst composition comprises $(Cu(II)(acac)_2)$.

The foam forming composition of any of the previous embodiments where the $(Cu(II)(acac)_2)$ is dissolved in a solvent.

The foam forming composition of any of the previous embodiments where the solvent comprises DMSO.

The foam forming composition of any of the previous embodiments where the copper catalyst composition comprises a co-diluent chosen as a fatty acid, a vegetable oil, or a combination thereof.

The foam forming composition of any of the previous embodiments where the copper catalyst composition comprises a copper concentration of about 0.04 to about 10% by weight of the catalyst composition, about 0.045 to about 5% by weight of the catalyst composition, about 0.05 to about 2% by weight of the catalyst composition, even about 0.075 to about 2% by weight of the catalyst composition.

The foam forming composition of any of the previous embodiments where the foam-forming composition comprises an optional component (e) chosen from a blowing agent, a chain extender, a cross-linker, a filler, a reinforcement, a pigment, a tint, a dye, a colorant, a flame retardant, an antioxidant, an antiozonant, a UV stabilizer, an anti-static agent, a biocide, a biostat, or a combination or two or more thereof.

The foam forming composition of any of the previous embodiments comprising a co-catalyst (c').

The foam forming composition of any of the previous embodiments where the co-catalyst is chosen from a tertiary amine.

In embodiments, the tertiary amine is chosen from triethylenediamine, 2-methyltriethylenediamine, N,N,N',N'-tetramethylethylenediamine, N,N,N',N'-tetramethylpropylenediamine, N,N,N',N",N"-pentamethyldiethylenetriamine, N,N,N',N",N"-pentamethyl-(3-aminopropyl)ethylenediamine, N,N,N',N",N"-pentamethyldipropylenetriamine, N,N,N',N'-tetramethylhexamethylenediamine, bis(2-dimethylaminoethyl)ether, dimethylethanolamine, dimethylisopropanolamine, dimethylaminoethoxyethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethylaminopropyl)isopropanolamine, 3-quinuclidinol, N,N,N',N'-tetramethylguanidine, 1,3,5-tris(N,N-dimethylaminopropyl)hexahydro-S-triazine, 1,8-diazabicyclo[5.4.0]undecene-7, N-methyl-N'-(2-dimethylaminoethyl)piperazine, N,N'-dimethylpiperazine, dimethylcyclohexylamine, N-methylmorpholine, N-ethylmorpholine, 1-methylimidazole, 1,2-dimethylimidazole, 1-isobutyl-2-methylimidazole, 1-dimethylaminopropylimidazole, N,N-dimethyhexanolamine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, quinuclidine, 2-methylquinuclidine, or a combination of two or more thereof.

The foam forming composition of any of the previous embodiments where the co-catalyst is present in an amount of from about 0.1 to about 10% by weight of the catalyst composition.

In one embodiment, the present invention provides a foam formed from the foam-forming composition of any of the previous embodiments.

In one aspect, the technology involves a method for manufacturing foam comprising (i) combining: a) at least one polyol; b) at least one isocyanate; c) at least one copper catalyst composition; and d) at least one surfactant; and (ii) curing the mixture of (i).

In one embodiment, the copper catalyst composition comprises a copper (II) compound dissolved in a solvent.

The method according to any of the previous embodiments where the copper (II) compound comprises copper (II) coordinated to a ligand chosen from a carboxylate, a diketonate, a salicylate, an organic salt, a halide, or a combination of two or more thereof.

The method according to any of the previous embodiments where the copper catalyst composition comprises $(Cu(II)(acac)_2)$.

The method according to any of the previous embodiments where the $(Cu(II)(acac)_2)$ is dissolved in a solvent.

The method according to any of the previous embodiments where the solvent comprises DMSO.

The method according to any of the previous embodiments where the copper catalyst composition comprises a co-diluent chosen from a fatty acid, a vegetable oil, or a combination thereof.

The method according to any of the previous embodiments where the copper catalyst composition comprises a copper concentration of about 0.5 to about 10% by weight of the catalyst composition, about 1 to about 9% by weight of the catalyst composition, about 3 to about 7% by weight of the catalyst composition, even about 4 to about 5% by weight of the catalyst composition.

The method according to any of the previous embodiments comprising a co-catalyst (c').

The method according to any of the previous embodiments where the co-catalyst is chosen from a tertiary amine.

In embodiments, the tertiary amine is chosen from triethylenediamine, 2-methyltriethylenediamine, N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylhexamethylenediamine, bis(2-dimethylaminoethyl)ether, dimethylethanolamine, dimethylisopropanolamine, dimethylaminoethoxyethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethylaminopropyl)isopropanolamine, 3-quinuclidinol, N,N,N',N'-tetramethylguanidine, 1,3,5-tris(N,N-dimethylaminopropyl)hexahydro-S-triazine, 1,8-diazabicyclo[5.4.0]undecene-7, N-methyl-N'-(2-dimethylaminoethyl)piperazine, N,N'-dimetylpiperazine, dimethylcyclohexylamine, N-methylmorpholine, N-ethylmorpholine, 1-methylimidazole, 1,2-dimethylimidazole, 1-isobutyl-2-methylimidazole, 1-dimethylaminopropylimidazole, N,N-dimethyhexanolamine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, quinuclidine, 2-methylquinuclidine, or a combination of two or more thereof.

The method according to any of the previous embodiments where the co-catalyst is present in an amount of from about 0.1 to about 10% by weight of the catalyst composition.

The method according to any of the previous embodiments where the method further comprises combining components (a)-(d) with an optional component (e) chosen from a blowing agent, a chain extender, a cross-linker, a filler, a reinforcement, a pigment, a tint, a dye, a colorant, a flame retardant, an antioxidant, an antiozonant, a UV stabilizer, an anti-static agent, a biocide, a biostat, or a combination or two or more thereof.

The method according to any of the previous embodiments where the method wherein step (i) comprises frothing components (a)-(d) to form a frothed mixture.

DETAILED DESCRIPTION

Figure 1:
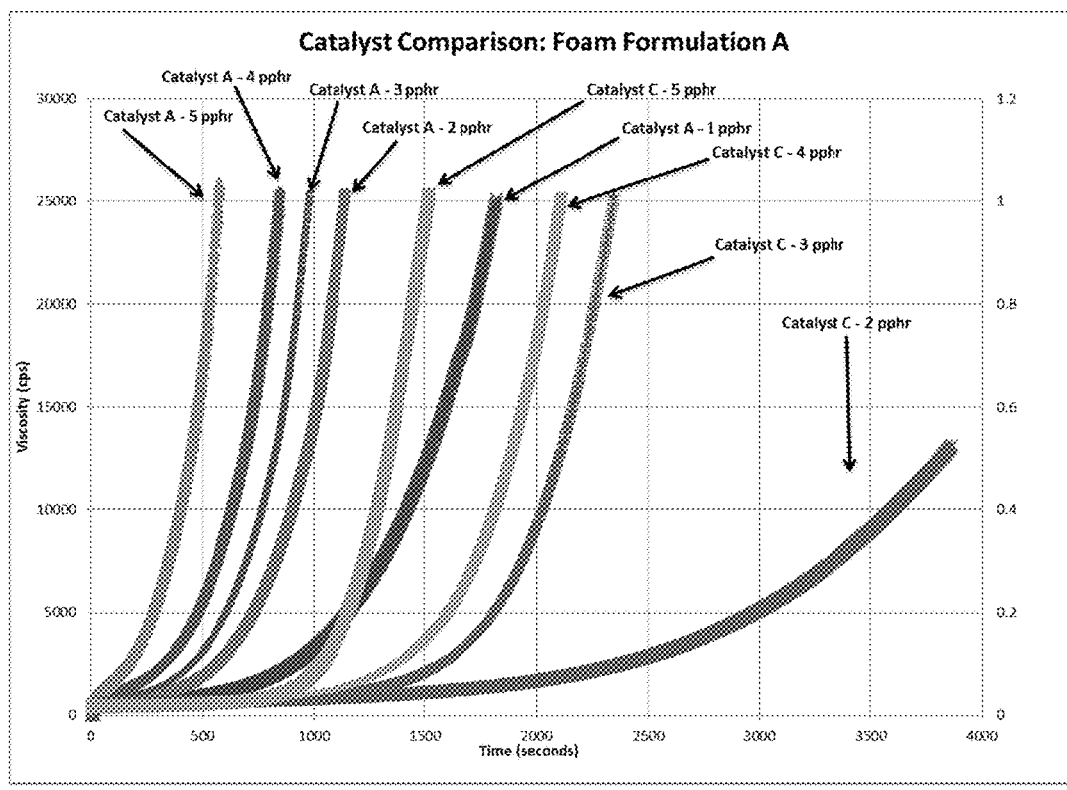
FIG. 1 is a graph comparing viscosity build in foam formulation A with two different catalysts.

The present technology provides polyurethane foam-forming compositions containing a copper catalyst, polyurethane foams formed from said polyurethane foam-forming compositions and processes for making said polyurethane foams.

The present technology provides a polyurethane foam-forming composition comprising: (a) a polyol; (b) an isocyanate; (c) a copper catalyst composition; (d) a surfactant; and (e) optional components. The foam-forming compositions employ a copper catalyst as an alternative to nickel that performs in a manner similar to nickel catalysts.

The polyol (a) component may be any polyol useful to form a polyurethane foam. The polyol may be a liquid polymer possessing hydroxyl groups. The term "polyol" may include linear and branched polyethers (having ether linkages), polyesters and blends thereof, and comprising at least two hydroxyl groups. In one embodiment, the polyol may be at least one of the types generally used to prepare polyurethane foams. Among the suitable polyols (a) for preparing the polyurethane foam are those having 2 to 8 hydroxyl groups per molecule and a number average molecular weight of from about 150 to about 10,000, about 200 to about 8,000, about 350 to about 7,500, about 500 to about 5,000, even about 1,000 to about 3,000. Here as elsewhere in the specification and claims, numerical values may be combined to form new or undisclosed ranges.

Included among the useful polyols are polyether diols and triols and polyols, polyester diols and triols and polyols, and hydroxyl-terminated polyolefin polyols such as the polybutadiene diols. Other useful polyols include sucrose and amine-started (initiated) polyols, polymer polyols (also graft polymer polyols, graft polyols or copolymer polyols, all of which are names used to describe dispersions of vinyl polymers in polyols produced by the in-situ polymerization of vinyl monomers (usually styrene and or acrylonitrile) in the base polyol), polyols derived from naturally occurring materials such as castor oil, chemically-modified soybean oil or other chemically-modified fatty acid oils and polyols resulting from the alkoxylation of such naturally occurring materials as castor oil and soybean oil.

Some specific, non-limiting examples of polyether polyols may include, but are not limited to, polyoxyalkylene polyol, particularly linear and branched poly(oxyethylene) glycol, poly(oxypropylene)glycol, copolymers of the same and combinations of two or more thereof. Non-limiting examples of modified polyether polyols include polyoxypropylene polyether polyol into which is dispersed poly(styrene acrylonitrile) or polyurea, and poly(oxyethylene/ oxypropylene) polyether polyols into which is dispersed poly(styrene acrylonitrile) or polyurea.

Suitable polyester polyols include, but are not limited to, aromatic polyester polyols such as those made with phthalic anhydride (PA), dimethlyteraphthalate (DMT) polyethyleneteraphthalate (PET) and aliphatic polyesters, etc.

Other non-limiting examples of suitable polyols may include those derived from propylene oxide and ethylene oxide and an organic initiator or mixture of initiators of alkylene oxide polymerization and combinations of two or more thereof.

In one embodiment, the polyurethane foam-forming composition may comprise a polyether polyol having a hydroxyl number of from about 10 to about 3000, from about 15 to about 1000, from about 20 to about 500, and even from about 30 to about 40. Here, as elsewhere in the specification and claims, numerical values may be combined to form new and non-disclosed ranges.

The foam-forming composition also includes an isocyanate (b). The isocyanate may include any organic compound contains at least two isocyanate groups that may be used for production of polyurethane foam. In one embodiment, the isocyanate may be an organic compound that comprises at least two polyisocyanate groups and generally may be any known or later discovered aromatic or aliphatic polyisocyanates.

According to one embodiment, the isocyanate (b) may be a hydrocarbon diisocyanate, (e.g., alkylenediisocyanate and arylene diisocyanate), such as toluene diisocyanate, diphenylmethane isocyanate, including polymeric versions, and combinations of two or more thereof. In another embodiment, the isocyanate (b) may be isomers of the above, such as methylene diphenyl diisocyanate (MDI) and 2,4- and 2,6-toluene diisocyanate (TDI), as well as known triisocyanates and polymethylene poly(phenylene isocyanates) also known as polymeric or crude MDI and combinations of two or more thereof. Isocyanate prepolymers of MDI made from the reaction of MDI with polyols; modified versions such as uretonimine-modified MDI; and combinations in any proportions of MDI variants named above. Also suitable are other aromatic or aliphatic polyisocyanates and modified versions thereof including uretonimine-modified polyisocyanates and their prepolymers. Blends of polyisocyanates are also within the scope of the technology.

In one embodiment, the isocyanate (b) may be at least one mixture of 2,4-toluene diisocyanate and 2,6-toluene diisocyanate. The 2,4-toluene diisocyanate may be present in an amount of from about 80 wt. pt. to about 85 wt. pt. of the mixture and the 2,6-toluene diisocyanate may be present in an amount of from about 20 wt. pt. to about 15 wt. pt. of the mixture. Here as elsewhere in the specification and claims, numerical values may be combined to form new or undisclosed ranges.

The amount of isocyanate (b) included in polyurethane foam-forming composition relative to the amount of other materials in polyurethane foam-forming composition is described in terms of "Isocyanate Index." The Isocyanate Index in the polyurethane foam-forming composition used in the process herein is of from about 60 to about 300, of from about 70 to about 200, from about 80 to about 120, and even from about 100 to about 105. Here as elsewhere in the specification and claims, numerical values may be combined to form new or undisclosed ranges.

The catalyst (c) for the polyurethane foam-forming compositions comprises a catalyst composition comprising a copper catalyst material. The catalyst composition comprises the copper catalyst and a solvent. The copper catalyst comprises a complex or salt of bivalent copper. The complex comprises copper coordinated to a ligand or counter ion. The ligand may be chosen from a carboxylate, a diketonate, a salicylate, an organic salt, a halide, or a combination of two or more thereof. Suitable carboxylates include, but are not limited to, salicylate, subsalicylate, lactate, citrate, subcitrate, ascorbate, acetate, dip ropylacetate, tartrate, sodium tartrate, gluconate, subgallate, benzoate, laurate, myristate, palmitate, propionate, stearate, undecylenate, aspirinate, neodecanoate, ricinoleate, etc. Examples of diketonates include, but are not limited to, acetylacetonate. Examples of suitable halides include bromide, chloride, and iodide. In one embodiment, the catalyst comprises cupric acetylacetonate ($Cu(II)(acac)_2$).

The catalyst composition comprises a solvent. Copper complexes generally exhibit poor solubility if added to a polyol resin component. Examples of suitable solvents include, but are not limited to, dialkyl sulfoxides such as dimethyl sulfoxide, diethyl sulfoxide, diisobutyl sulfoxide, and the like; N,N-dialkylalkanoamides such as N,N-dimethylformamide, N,N-dimethylacetamide, N,N-diethylacetamide, etc.; phosphonates such as O,O-dimethyl, O,O-diethyl, O,O-diisopropyl methylphosphonates, O,O-di(2-chloroethyl) vinylphosphonate, etc.; aromatic solvents such as toluene, xylene, benzene, etc.; ethereal solvents such as diethyl ether, dioxane, diglyme, etc.; tetramethylenesulfone, 1-methyl-2-pyrrolidone, trialkyl phosphates such as trimethyl and triethyl phosphates, acetonitrile, and the like, and organic carbonates like di-methyl-carbonate, ethylene-carbonate, propylene-carbonate. In one embodiment, the solvent is dimethyl sulfoxide (DMSO).

The catalyst composition may optionally comprise a co-diluent. The co-diluent may be chosen from a fatty acid, a vegetable oil, or a combination thereof. Examples of suitable vegetable oils include, but are not limited to, sunflower oil, safflower oil, castor oil, rapeseed oil, corn oil, Balsam Peru oil, soybean oil, etc. Suitable fatty acids include, but are not limited to, $C_8$ to $C_{22}$ mono- and dicarboxylic fatty acids. Other suitable co-diluents include, but are not limited to, polyether polyols, Arcol 11-34, polyether diols such as PEG-400 and PPG-425, and propylene carbonate.

The catalyst composition may comprise the copper complex or salt in an amount of from about 0.04 wt % to about 10 wt %; from about 0.1 to about 7 wt % from about 0.5 to about 5 wt %; from about 1 to about 2.5 wt %. Here as elsewhere in the specification and claims, numerical values may be combined to form new and non-disclosed ranges. The balance of the catalyst composition may comprise the solvent and/or co-diluent.

The amount of copper catalyst (copper complex or salt) present in the reactive polyurethane foam forming composition may be from about 0.1 to about 10 wt %; from about 0.5 to about 7 wt %; from about 1 to about 5 wt % even from about 2 to about 4 wt % based on the weight of the active hydrogen-containing component. In embodiments, the amount of the copper catalyst present in the polyurethane foam forming composition is about 0.3 wt % to about 0.9 wt %, based on the weight of the active hydrogen-containing component. The catalyst composition should be charged to the foam forming composition at a concentration to provide the desired level of copper catalyst. In embodiments, the catalyst composition contains 0.045% Cu+/−0.005% Cu or 0.16%-0.18% Cu(II) salt, and the catalyst composition may be charged at a minimum of 1% or 1 pphr. The activity of the reaction is based on the Cu content. In one embodiment, the wt. % of the catalyst is 2% or 2 pphr, and therefore the charge relative to Cu(II) is 0.32%-0.36%.

The copper complex may be added to and dissolved in the solvent, and the resulting catalyst solution may be filtered to clarity and stored under nitrogen at room temperature. Alternatively, the solution may not require filtration except in instances when the Cu(II) salt is overcharged during production.

It will be appreciated, that the catalyst composition may comprise a mixture of two or more Cu(II) salts. In one embodiment, a catalyst composition may be provided with a first Cu(II) salt dissolved in the solvent system. A second Cu(II) salt may be added to the composition comprising the first Cu(II) salt. In embodiments, the catalyst composition comprises Cu(II) acetylacetonate and Cu(II) acetate. Other combinations of metal salts may be chosen as desired for a particular purpose or intended application.

The catalyst composition may be charged to the polyol to provide a copper concentration of about 0.04 to about 10% by weight of the catalyst composition, about 0.045 to about 5% by weight of the catalyst composition, about 0.05 to about 2% by weight of the catalyst composition, even about 0.075 to about 2% by weight of the catalyst composition. Here as elsewhere in the specification and claims, numerical values may be combined to form new or undisclosed ranges.

It has been found that providing a copper (II) based catalyst as a catalyst composition in a solvent, copper (II) may be used as a suitable catalyst to form polyurethane foam and may be a suitable replacement for nickel. Copper generally promotes fast reactions in polyurethane compositions, which may not be practical in forming suitable foams. However, the present technology using the present catalyst compositions has been found to provide a catalyst that performs in a manner similar to nickel and allows for production of stable foams.

The foam-forming composition and process may further comprise a co-catalyst (c'). In accordance with the present technology, it has been found that a tertiary amine may be employed with the present copper catalysts to provide a foam with desired properties or reactivity. While not being bound to any particular theory, the tertiary amine co-catalyst may facilitate reactivity of the copper catalyst. The use of the co-catalyst may allow for adjusting or tuning the reactivity of the system. The co-catalyst may also allow for attenuating the reactivity while keeping the concentration of copper in the system relatively low.

Examples of suitable tertiary amines as the co-catalyst (c') include, but are not limited to, triethylenediamine, 2-methyltriethylenediamine, N,N,N',N'-tetramethylethylenediamine, N,N,N',N'-tetramethylpropylenediamine, N,N,N',N", N"-pentamethyldiethylenetriamine, N,N,N',N",N"-pentamethyl-(3-aminopropyl)ethylenediamine, N,N,N',N", N"-pentamethyldipropylenetriamine, N,N,N',N'-tetramethylhexamethylenediamine, bis(2-dimethylaminoethyl)ether, dimethylethanolamine, dimethylisopropanolamine, dimethylaminoethoxyethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethylaminopropyl)isopropanolamine, 3-quinuclidinol, N,N,N',N'-tetramethylguanidine, 1,3,5-tris(N,N-dimethylaminopropyl)hexahydro-S-triazine, 1,8-diazabicyclo[5.4.0]undecene-7, N-methyl-N'-(2-dimethylaminoethyl)piperazine, N,N'-dimetylpiperazine, dimethylcyclohexylamine, N-methylmorpholine, N-ethylmorpholine, 1-methylimidazole, 1,2-dimethylimidazole, 1-isobutyl-2-methylimidazole, 1-dimethylaminopropylimidazole, N,N-dimethyhexanolamine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, quinuclidine, 2-methylquinuclidine, etc., or a combination of two or more thereof.

The co-catalyst may be provided to the foam composition or the catalyst composition such that it is present in an amount of from about 0.1 to about 10% by weight of the catalyst composition; from about 0.2 to about 8% by weight of the catalyst composition; from about 0.5 to about 5% by weight of the catalyst composition; even from about 1 to about 4% by weight of the catalyst composition. Here as elsewhere in the specification and claims, numerical values may be combined to form new and non-disclosed ranges.

In embodiments, the co-catalyst may be added to the system separately from the copper based catalyst. In other embodiments, the catalyst comprises a composition comprising the copper based catalyst and the co-catalyst. That is, the copper based catalyst and the co-catalyst may be combined in situ to provide a catalyst composition.

The surfactant (d) component may be any suitable surfactant useful to form a particular type of polyurethane foam. Suitable surfactants include, but are not limited to, polyethylene glycol, polypropylene glycol, ethoxylated castor oil, oleic acid ethoxylate, alkylphenol ethoxylates, copolymers of ethylene oxide (EO) and propylene oxide (PO), butylene oxide, and copolymers of silicones and polyethers (silicone polyether copolymers), copolymers of silicones, dimethyl silicone oils, and copolymers of ethylene oxide and propylene oxide and any combination of two or more thereof. Other useful surfactants include alkoxylates, ethoxylates, alkylarylalkoxylates, especially ethoxylates or propoxylates and their derivatives including alkyl phenol ethoxylate; arylarylalkoxylates, including ethoxylates or propoxylates. and their derivatives; amine alkoxylates, amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; amine ethoxylates; alkyl polyglycosides; oxo-tridecyl alcohol ethoxylates; alkyl acetylenic diols, pyrrolidone based surfactants, 2-ethyl hexyl sulfate, isodecyl alcohol ethoxylates, ethylene diamine alkoxylates; and combinations of two or more thereof. Examples of suitable surfactants include those listed in U.S. Pat. No. 8,476,330 which is incorporated by reference herein in its entirety.

The surfactant (d) may be added in an amount ranging from 0.01 wt. pt. to about 20 wt. pt., from about 0.1 wt. pt. to about 5 wt. pt., even 0.2 wt. pt. to about 1 wt. pt. of the total composition.

The polyurethane foam-forming composition may include other optional components (e). Although, as further described herein, the foam may be provided by mechanical frothing or whipping of the foam-forming composition, the composition may optionally include a blowing agent. The blowing agent may be one blowing agent of the physical and/or chemical type. Typical physical blowing agents include, but are not limited to methylene chloride, acetone, water or $CO_2$, which are used to provide expansion in the foaming process. A typical chemical blowing agent is water, which reacts with isocyanates in the foam, forming reaction mixture to produce carbon dioxide gas. These blowing agents possess varying levels of solubility or compatibility with the other components used in the formation of polyurethane foams. Developing and maintaining a good emulsification when using components with poor compatibility is critical to processing and achieving acceptable polyurethane foam quality.

Other optional components (e), such as additives, may be added to polyurethane foam to impart specific properties to polyurethane foam. Examples of other suitable additives may include, but are not limited to, a chain extender, a cross-linker, a filler, a reinforcement, a pigment, a tint, a dye, a colorant, a flame retardant, an antioxidant, an antiozonant, a UV stabilizer, an anti-static agent, a biocide and a biostat.

Methods for producing polyurethane foam from the polyurethane foam-forming composition of the present technology are not particularly limited. Various methods commonly used in the art may be employed. For example, various methods described in "Polyurethane Resin Handbook," by Keiji Iwata, Nikkan Kogyo Shinbun, Ltd., 1987 may be used. For example, the composition may be prepared by combining the polyols, amine catalyst, surfactants, blowing agent, and additional compounds including optional ingredients into a premix. This polyol blend is added to and mixed with the isocyanate.

In one embodiment, the foam may be provided by mechanical frothing or whipping of the foam-forming composition.

The mechanical frothing operation of the foam-forming composition may be performed in high shear mixing equipment such as an OAKES mixer or FIRESTONE mixer and similar equipment. According to one embodiment, the polyurethane foam is prepared by a process utilizing high-shear mixing of the polyurethane foam-forming composition components herein to make mechanically frothed foam. Some of the components may be premixed into a pre-blend in a batch mixing process prior to addition of other components at the high-shear mixer. Further, the components may be premixed using a low shear mixer prior to entering a high shear mixer or mixing process. Furthermore, some components may be added into the high shear mixing process or mixer at the same location as other components enter in the mixhead or in locations within the mixer that represent various degrees of completion of the mixing process. The frothed polyurethane foam may be cured (i.e., completing the urethane and possibly urea reactions) by known and conventional means.

Gas such as air, nitrogen, carbon dioxide may be injected into the mixing of components or entrained through capture from above the surface of mixed components. The gas may also be injected into the high-shear mixer through pressure. Mixers include the aforementioned or other similar equipment that produce high shear conditions during mixing.

EXAMPLES

Making Master Resin Blend

Master resin blends were made for each of the following design sets of experiments. Prior to each foaming experiment, resin material was taken from the master blend and the other additive components (i.e., surfactant and catalyst) were added prior to mechanical frothing of the system.

Master Resin Blend for Mechanically Frothed Foam: PU Foam Formulation A

A resin blend was made from 70 parts ARCOL 11-34 (hydroxyl number of 35), a San graphed polymer polyether polyol, 30 parts ARCOL 24-32 (hydroxyl number of 32), and 15 parts dipropylene glycol (hydroxyl number 836). The above formulation was formed by adding the first two polyols and the chain extender into one-gallon glass container (jug) and mixing into a single master batch of resin (typically 3450 gram batch of 2100 grams of Arcol 11-34, 900 grams of Arcol 24-32, and 450 grams of dipropylene glycol).

The mixing of the master resin blends described above was accomplished by: pouring all the described components into a one gallon glass jug, sealing the jug with a cap, putting the glass jug onto a glass jar or jug roller, and rolling at "medium speed" for approximately two hours. These mixing conditions assure that a homogeneous mixture of components is formed. Additionally, additional water absorption from the atmospheric moisture is avoided by mixing these components within a closed container.

Making Mechanically Frothed Foams by Handmix Method

A 4-quart stainless steel mixing bowl from a KitchenAid® KSM-90 mixer was placed on a bench top scale and the scaled was tared to read zero. Then 300 grams of the blended master resin batch (polyether polyol; SAN grafted polyether polyol, and a dipropylene glycol chain extender) were poured into the 4-quart stainless steel mix bowl. Next, 2 parts $(AB)_n$-type block copolymer of polymethylsiloxane/polyether per 100 parts of master resin blend and 2 parts urethane catalyst per 100 parts of master resin blend were added to the blended master resin batch in the mix bowl. The urethane catalyst was selected from (A) 10% nickelacetoacetonate in polyether polyol (hydroxyl number of 51); (B) Cu(II) Salt in DMSO at (0.09% Cu) (hydroxyl number of 0); (C) Cu(II) Salt in DMSO/Castor Oil (at 0.045% Cu) (hydroxyl number of 83); (D) Amine catalyst (hydroxyl number 560); (E) Mercury Catalyst; (F) Formulated catalyst (hydroxyl number 83); and (G) Increased Cu(II) concentration version of Catalyst C. The bowl was put onto the KitchenAid mixer and the ingredients were mixed at the lowest speed setting (1) for 2 minutes using the whisk mixing attachment. The mixer was stopped and imine modified isocyanate (29.3% NCO) was added in an amount that gave an isocyanate index value of 103.5. The weight of isocyanate added was adjusted, for each foam made, due to the different hydroxyl content of the catalysts used but ranged from 113.49 to 114.78 grams. The mixer speed was then turned up to the highest setting (10) and mixing was allowed to continue for 10 minutes. After this mixing was completed, some of the frothed mixture was quickly poured into a 250 ml plastic disposable beaker until the foam was slightly above the top of the cup. The beaker with foam was tapped down for about 10 seconds onto the laboratory bench to allow larger trapped air bubbles to rise out of the foam and then the foam was scraped off the top of the beaker such that its upper surface was flush with that of the top of the beaker. With a known volume of the beaker, the weight of the froth in the beaker was measured and the froth density of the foam was calculated (from the foam weight divided by the volume of the beaker). Most of the remaining frothed foam (~340 grams) was poured into 8"×8" Silicone baking pans and then put into an oven set at 130° C. for 45 minutes to cure. The foam was then removed from the oven and surface quality and shrinkage was noted.

Master Resin Blend for PU Elastomer Formulation

A resin blend was made from 96 parts ARCOL 11-34 (hydroxyl number of 35) and 4 parts ethylene glycol (hydroxyl number 1807). This formulation was formed by adding the polyol and the chain extender into one-gallon glass container (jug) and mixing into a single master batch of resin (typically 3450 gram batch of 3255 grams of Arcol 11-34 and 195 grams of ethylene glycol). Mixing of the master resin was conducted as described above for PU Foam Formulation A master resin blend.

Plaque Mold Procedure

Plaque molds were also prepared. These were prepared by two different mixing methods: 1) via frothing as described above and below or 2) via drill press mixing described below. The drill press method was shorter and entrains very little air into the PU resin. The master resin was placed in a 1 qt. cylindrical mixing cup along with catalyst and surfactant and then mixed for 10 seconds on a Wilton drill press at 2000-4000 rpm. Isocyantate was then added (100-103.5 index) over 5 seconds and mixed again at the same speed for 10 seconds. After mixing, the material was poured into the mold (liquid full and heated to 160-180° F.) and sealed for 30-60 minutes. The plaque was then removed and cooled for 24 hours. Pieces were stamped out of the plaque mold for determination of % elongation (ASTM D-412, DieA), tensile strength (ASTM D-412, Die A), and tear strength (ASTM D-624, Die C). Physical properties were measured on a Zwick static materials testing machine using text expert data acquisition software.

Plaques made with frothed resin were prepared after determining froth density (FD) as described above. Once the FD was determined ~100-200 grams of frothed resin was placed into the plaque mold (160-180° C.) and sealed for 30-60 minutes. After cooling for at least 24 hours, parts were stamped out for the determination of % elongation, tensile strength, and tear strength as described above. The results are shown in Table 8 below.

Mixing and Test Procedures

Mixing Procedure 1: Drill Press Mixing

Three formulations (PU Foam Formulation A, PU Elastomer Formulation, and PU Foam Formulation B; Tables 2, 3, and 4, respectively) were mixed utilizing this method. The polyol resin was weighed into a tared cup and then mixed on the drill press at 3500 rpm for ten seconds. Isocyanate was added over five seconds and the resulting admixture was mixed for another ten seconds at 3500 rpm.

When mold plaques were being prepared the specified amount of resin was poured into the molds, the molds were sealed and the plaques were removed at the specified time. After setting for 24 hours the parts used for determination of physical properties were stamped out.

When reactivity studies were conducted on the Brookfield viscometer, the resulting PU resin was poured into a paper cup held inside of an insulated container. The Brookfield spindle was placed at approximately 1 cm from the bottom of the cup and analysis began upon termination of the mixing sequence. The Brookfield apparatus was coupled with DASYLab® data acquisition software.

Tack-free data was obtained by drawing the resin down onto a Fluorglas mat on a hot plate at 130° C.

Mixing Procedure 2: Kitchen Aid® Mixing

As described above, PU Formulation A was weighed into a tared mixing bowl. The mixing bowl was then placed onto the mixer, secured and the atmosphere inserted with nitrogen gas for two minutes. The polyol resin, catalyst and surfactant were then mixed for two minutes on the lowest speed setting using the whisk attachment. Isocyanate was then added at the specified index and mixed on high speed for ten minutes. The resulting froth was then poured into a tared cup of known volume and weighed, obtaining froth density. After the froth density was measured the froth was then either placed into a mold, silicone baking dish, or drawn down as a thin film for subsequent analyses, such as physical property measurements or tack free time determination.

Table 1 lists the catalysts that were compared in performance and reactivity for this study. Catalysts C and B represent copper catalysts in accordance with the present technology, where catalyst B contains twice the concentration of active metal salt compared to catalyst C. Catalyst A is a standard nickel catalyst and catalyst E is a standard mercury catalyst used for comparison. Catalyst F is a formulated combination of catalysts C and D. Catalyst G is similar to catalyst C, but with a higher concentration of Cu(II) provided by an alternative Cu(II) salt.

TABLE 1

| Catalysts | |
|---|---|
| Catalyst | Description |
| A | Niax* Catalyst LC-5615** |
| B | UAX-1319** |
| C | Niax Catalyst LC-5635** |
| D | Amine Catalyst** |
| E | Mercury Catalyst† |
| F | Formulated catalyst C and D** |
| G | Increased Metal Concentration Niax Catalyst LC-5635** |

*Niax is a trademark of Momentive Performance Materials, Inc.
**Product of Momentive Performance Materials
†Product of Vertellus The elastomer formulation (Table 3) also described above, was employed to compare catalyst systems C/D and F (in accordance with the present invention) to mercury based catalyst E. This simple formulation provides a first general look at reactivity, when the viscosity build and exotherm are monitored over time.

Tables 2-4 describe the foam and elastomer formulations utilized in this study. Foam formulation A (Table 2), was the primary foam formulation used for testing and development of new Catalysts C and B. This formulation is representative of a mechanically frothed foam formulation which is the typical application where nickel based catalysts are used.

Foam formulation B (Table 4) served as a means for comparing/determining the selectivity of the Catalysts C, C/D and E in water containing formulations. With and without the addition of water the rise height and exotherm can be observed to compare mercury vs. non-mercury containing catalyst selectivity for the gel or blow reaction. Foam formulation B was not prepared as a Master Batch.

TABLE 2

| PU Foam Formulation A* | |
|---|---|
| Raw Material | pphr** |
| Polyether Polyol (OH = 35) | 61 |
| Polymer Polyol (OH = 32) | 26 |
| DPG | 13 |
| Surfactant | 2 |
| Catalyst | 0.1-5 |
| | Index |
| Modified MDI (29% NCO, Eq. Weight = 144) | 103.5 |

*Product formulations are included as illustrative examples only. Momentive makes no representation or warranty of any kind with respect to any such formulations, including, without limitation, concerning the efficacy or safety of any product manufactured using such formulation.
**pphr = parts per hundred resin, each resin formulation is specified in the Tables 2-4.

TABLE 3

PU Elastomer Formulation*

| Raw Material | pphr |
|---|---|
| Polyether Polyol (OH = 35) | 94 |
| EG | 6 |
| Catalyst | 0.1-5 |

| | Index |
|---|---|
| Modified MDI (29% NCO, Eq. Weight = 144) | 103.5 |

*Product formulations are included as illustrative examples only. Momentive makes no representation or warranty of any kind with respect to any such formulations, including, without limitation, concerning the efficacy or safety of any product manufactured using such formulation.

TABLE 4

PU Foam Formulation B*

| Raw Material | pphr |
|---|---|
| Polyether Polyol (OH = 201) | 90 |
| Polyether Polyol (OH = 33) | 10 |
| Water (OH = 6228) | 0-5 |
| Surfactant | 1.3 |
| Catalyst | 0.1-5 |

| | Index |
|---|---|
| TDI | 89 |

*Product formulations are included as illustrative examples only. Momentive makes no representation or warranty of any kind with respect to any such formulations, including, without limitation, concerning the efficacy or safety of any product manufactured using such formulation.

Examples 1-18

Demonstration of Latency and Rapid End-Cure

Key attributes of catalyst A in PU foam formulation A are the extended working time with rapid end-cure once heated. Attaining this combination of features is difficult. These examples evaluate latency and catalytic ability with a simple catalyst formulation. Catalyst C was compared to catalyst A in Foam formulation A under cold cure conditions and the viscosity build and exotherm were observed. This data can be seen in FIG. 1. Catalyst A achieves 5000 cps at ~500 seconds (8 min) when used at 2-4 pphr. Catalyst C at a use level of 5 pphr in this formulation reaches 5000 cps at ~1150 seconds (19 min). A use level of 2 pphr Catalyst C under cold cure conditions does not achieve a viscosity of 5000 cps until ~50 minutes. Catalyst C appears to provide much greater variation in cure rate at use levels between 2 and 5 parts, where Catalyst A shows little variation at use levels between 2 and 4 parts. Catalyst C at the same use level as catalyst A does provide an extended working time.

Figure 2:
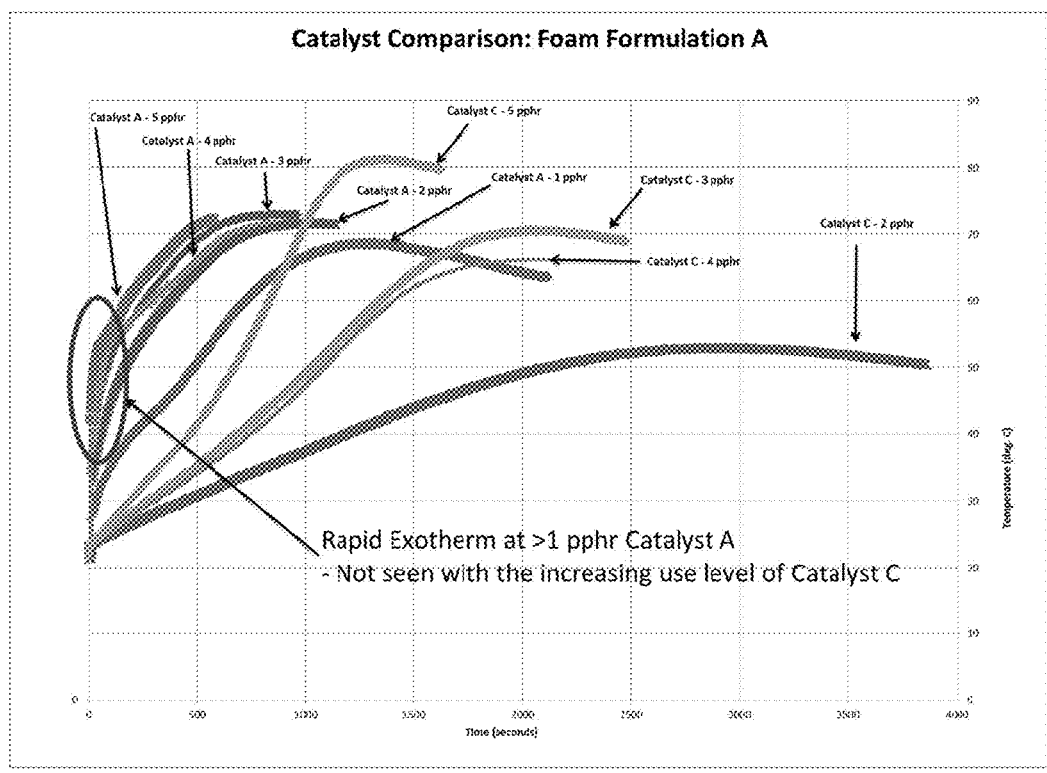
FIG. 2 is a graph comparing exotherm development in foam formulation A with two different catalysts.

FIG. 2 depicts the exotherm profile for catalyst A and catalyst C in Foam Formulation A. Each exotherm corresponds to the viscosity build profile depicted in FIG. 1. Both catalysts A and C are heat activated, whereby they begin to catalyze the PU reaction at a rapid rate at higher temperatures. At use levels higher than 1.0 pphr catalyst A provides a much more rapid exotherm, which corresponds to reaching the activation temperature much more quickly, therefore much more rapid cure (achieving 5000 cps very quickly at >2 pphr). Catalyst C appears to be activated at approximately the same temperature of ~70-80° C. (FIGS. 2 and 3) but requires more time to reach that temperature under cold cure processing parameters. This difference may be due to other variables such as carrier solvent or other components within the catalysts compositions.

Figure 3:
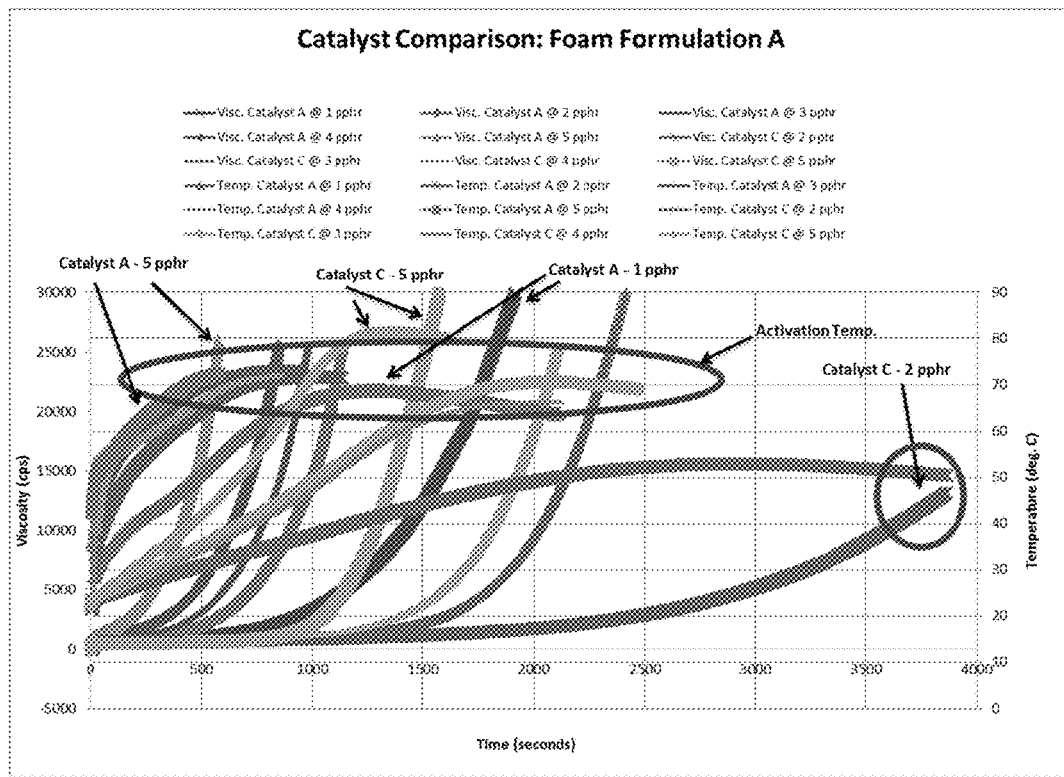
FIG. 3 is a graph combining the graphs of FIGS. 1 and 2.

FIG. 3 is an overlay graph of both sets of data from FIGS. 1 and 2. The viscosity build for both catalyst A and catalyst C begins after each reaches an exotherm temperature of at least 70° C.

Tack-Free Time (Examples 1-8)

Determination of Tack Free Time

The thin film tack-free times were determined by mixing the resin using a drill press then drawing the material down on a Fluorglass sheet on a hot plate at ~130° C., the thickness of the 'thin film' was ⅛ inch. A tongue depressor was used to confirm a tack-free surface. Froth Density was determined by mixing the resin on a Kitchen Aid® Mixer, whipping in air for 10 min and weighing the resulting froth in a tared cup of known volume. The resulting froth was then drawn down as described above and tack-free time was determined.

Table 5 shows the tack free times and froth density data for catalyst A, C, and B. Looking at the tack free time, at 5 pphr catalyst B is essentially equivalent to Catalyst A and Catalyst C lags by only 13 seconds. At 2 pphr, a more practical use level, catalyst C and catalyst B** both give tack-free times that are about 3 and 2.2 times that of catalyst A, respectively. In general, it thus appears that Catalyst C or B could be a suitable replacement for catalyst A in certain formulations and applications with minimal processing modifications where high temperatures are used. Rapid end-cure does not occur with catalyst C in the absence of external heat.

TABLE 5

Thin Film Tack-Free Time*

| Ex. | Catalyst | use level (pphr) | Tack-free time (sec) | Froth Density (Kg/m³) |
|---|---|---|---|---|
| 1 | C | 5 | 52 | — |
| 2 | C** | 2 | 120 | 278.2 |
| 3 | C | 1 | 236 | 273.2 |
| 4 | B | 5 | 37 | — |
| 5 | B*** | 2 (50% dilute) | 88 | 276 |
| 6 | A | 5 | 39 | — |
| 7 | A | 2 | 40 | 288.2 |
| 8 | A | 1 | 80 | 291 |

*Foam Formulation A was used (Table 2).
**Average of ten experiments (range = 112-130 seconds).
***Catalyst B was diluted to the same active metal level as catalyst B.

Higher temperature will prove advantageous for the use of catalysts C and B. The tack-free time for catalyst C (Table 5) is still not in line with that of catalyst A, however in the presence of heat the activity is markedly increased, compared to that of the cold-cure viscosity experiment. Froth densities for foams made using catalysts C and B are in line with and slightly lower than the froth density obtained for foams made with catalyst A. Froth Densities were only measured for experiments where typical loadings were employed.

Figure 4:
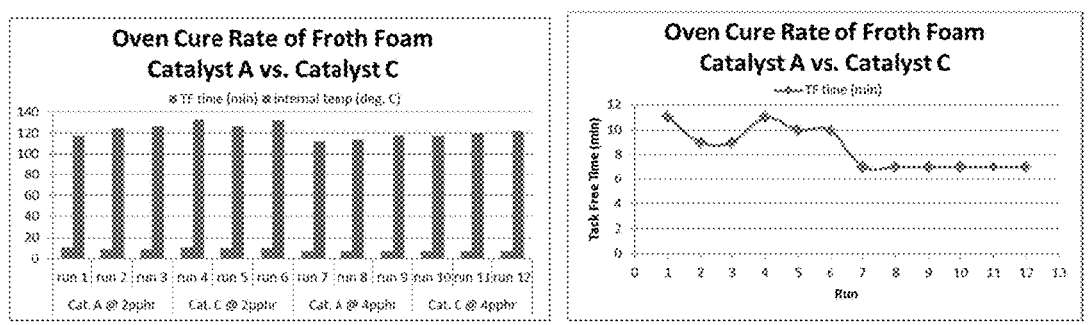
FIG. 4 shows graphs illustrating the internal foam temperature and tack free time for mechanically frothed foams employing two different catalysts.

Froth foam tack-free times were also determined in an oven with 340 g PU pour using Formulation A (FIG. 4). Three foams each were made using catalyst A at 2 pphr (runs 1-3) and compared to three foams each made using catalyst C at 2 pphr (runs 4-6), with a targeted density of ~300-320 Kg/m³ (18-20 pcf). There are slight differences in the internal temperatures with the first three runs averaging 122° C.

and runs 4-6 average 130° C. Surface tack-free times show slight differences with catalyst C averaging ~11 min and catalyst A averaging ~8 min. When use levels were increased (runs 7-12, 4 pphr each) the tack free times were the same for both Catalyst A and Catalyst C (7 minutes). At increased use levels catalyst C appears to provide similar cure rate to that of catalyst A. Lower use levels of catalyst C do not cure as rapidly as catalyst A and would likely require higher temperatures to activate and cure the article efficiently.

Physical Properties Comparison (Examples 9-16)

Plaque molds (preparation detailed above) were made with foam formulation A utilizing both a drill press mixing method (mixing method 1; elastomeric product results) and a Kitchen Aid® mixing method (mixing method 2). The difference between the mixing methods, as noted above, is the amount of air that gets entrained (whipped in) in the resin which results in a large difference in density.

As can be seen in Table 6, Catalyst B provides comparable physical properties to catalyst A. Through frothing the resin, the material becomes weaker in general due to the increase in cellular nature. Catalyst B provided better physical properties when the resin was frothed, whereas catalyst A provided better physical properties when the resin was mixed without frothing. Mixing time may be an influencing factor here as well. Drill press mixing takes place over 15 seconds at 3500 rpm, whereas the Kitchen Aid® mixing takes place at much lower rpm for 10 minutes. Once mixed, the resin was then poured into an isothermal (61° C.) water jacketed mold with dimensions of 304.8 mm×304.8 mm×6.35 mm. The demold times for these examples were 90 minutes for the parts made with Frothed resin and 60 minutes when the resin was not Frothed.

TABLE 6

Physical Properties of Elastomeric and Frothed Res in Plaque Molds: Catalyst A vs. Catalyst B

| Ex. | Catalyst | Tensile Breaking strength (MPa)** | Elongation (%)** | Tear Strength (MPa)*** | Density (Kg/m³) |
|---|---|---|---|---|---|
| Elastomeric Plaques | | | | | |
| 9 | A | 0.137 | 416.26 | 0.135 | 687 (42.8 pcf) |
| 10 | B | 0.121 | 357.04 | 0.097 | 696 (43.4 pcf) |
| Frothed Resin Plaques | | | | | |
| 11 | A | 0* | 534.21 | 0.0153 | 211 (13.2 pcf) |
| 12 | B | 0* | 584.44 | 0.0187 | 217 (13.5 pcf) |

*Sample did not break.
**ASTM D-412 "Die A"
***ASTM D-624 "Type C Die"

Plaque molds (similar to those above) were prepared using Foam Formulation A (mixing method 2—Kitchen Aid®). 2×2 squares were stamped out of the plaque and four were stacked and weighed. This was conducted twice for each plaque. The density reported for each sample is that which was obtained based on the dimensions and weight of the subsequent 2×2×1 inch set. Each set was then analyzed for compression set at 50% compression. This data, presented in Table 7, is comparable for the two catalysts with the only differentiating data being that catalyst C displays slightly less compression set at 50% compression than did catalyst A.

TABLE 7

Compression Set Data*: Catalyst A vs. Catalyst C in Foam Formulation A.

| Ex. | Initial Thickness (in) | Final Thickness (in) | % Compression | Compression Deformation % | Catalyst (2 pphr) | plaque weight (g) | Foam Density (Kg/m³) |
|---|---|---|---|---|---|---|---|
| 13-1 | 1.0305 | 0.5385 | 47.74 | 92.74 | A | 150.1 | 348 (21.7 pcf) |
| 13-2 | 1.0365 | 0.5365 | 48.24 | 93.20 | | | 348 (21.7 pcf) |
| 14-1 | 1.0335 | 0.542 | 47.56 | 92.13 | A | 151.5 | 369 (23.0 pcf) |
| 14-2 | 1.0385 | 0.543 | 47.71 | 92.01 | | | 374 (23.3 pcf) |
| 15-1 | 1.033 | 0.59 | 42.88 | 83.11 | C | 136.8 | 332 (20.7 pcf) |
| 15-2 | 1.038 | 0.5805 | 44.08 | 85.04 | | | 332 (20.7 pcf) |
| 16-1 | 1.0255 | 0.5695 | 44.47 | 86.77 | C | 142.6 | 326 (20.3 pcf) |
| 16-2 | 1.02 | 0.5725 | 43.87 | 86.06 | | | 326 (20.3 pcf) |

*ASTM D-3574

Catalyst C provides slightly lower density than catalyst A. Tensile and Tear strengths are poor as a result of the formulation utilized.

Catalyst Synergy Approach

Both catalyst A and catalyst C provide latency as shown in FIGS. 1-3. However at elevated dosage (5 pphr) catalyst A activates with substantial viscosity build at 50-70° C. with an initial relatively rapid exotherm, rising to nearly 50° C. within 30 seconds, much more rapidly than that of Catalyst C at 5 pphr. The following examples employ an initiator or front-end catalyst with catalyst C to provide an exotherm (temp. >70° C.) that would enable earlier activation of the catalyst, without affecting the latency in PU foam formulation A.

Figure 5:
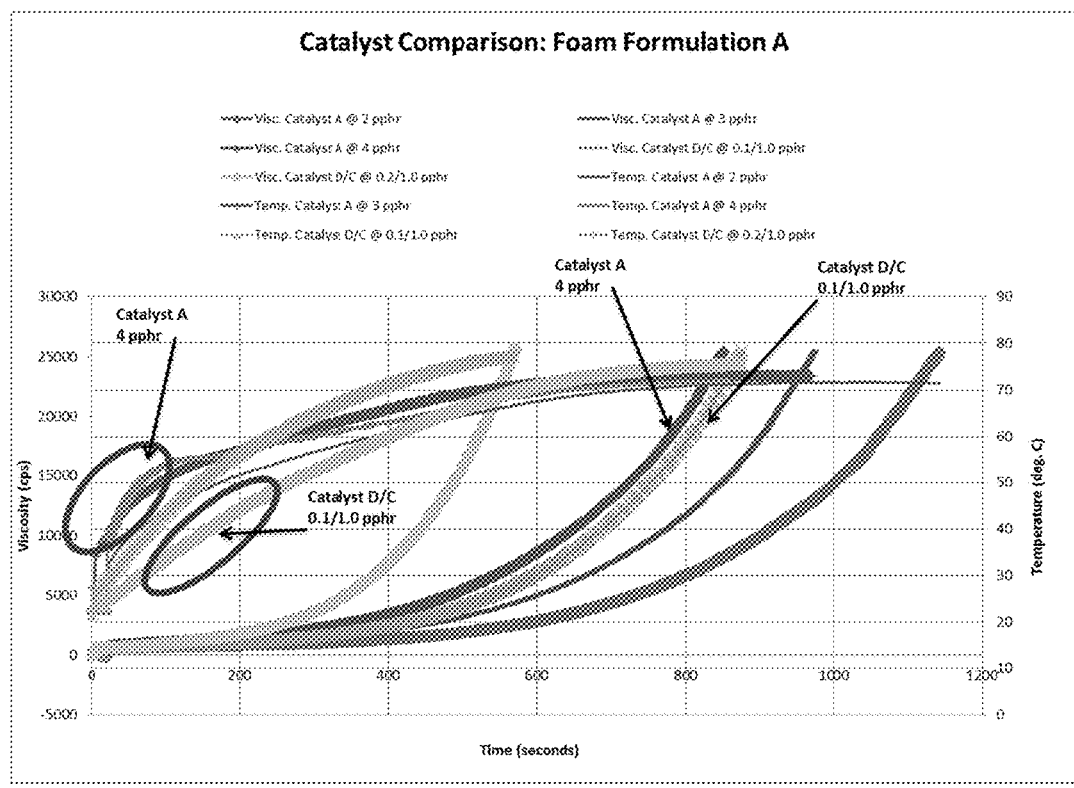
FIG. 5 is a graph comparing viscosity build in foam formulation A with different catalysts.

Catalyst D was employed in combination with catalyst C where we see an increase in reactivity (FIG. 5). The combination of catalyst D at 0.1 pphr and catalyst C at 1.0 pphr follows the same viscosity curve as that of catalyst A at 4 pphr. The temperature (reaction exotherm) reaches 70° C. within 600 seconds similarly to the exotherm of catalyst A. Catalyst A at this level exhibits a rapid exotherm over the first 90 seconds and then levels off at ~55° C. with gradual increase to 70° C. where the viscosity then begins to build. Catalyst system D/C does not exhibit this initial rapid exotherm and still achieves approximately the same viscosity build over time as catalyst A. The exotherm for catalyst D/C also achieves 70° C. at approximately the same time as that of catalyst A.

The catalyst combination D/C is a viable solution to the replacement of nickel based catalyst A (FIG. 5). Catalyst D/C at low dosage maintains the parabolic viscosity build and provides equivalent latency to that of catalyst A at elevated dosage, indicating that a slightly lower use level of the combined catalyst system would mimic the performance of typical use levels of catalyst A. Catalysts B and C alone demonstrate latency, but higher use levels are required to perform similarly to catalyst A.

Mercury Replacement (Examples 17-18)

The viability of catalyst B, C, and C/D as potential mercury catalyst replacements was also evaluated. The parabolic cure profile (viscosity build curve) of catalyst C negates its potential as a mercury replacement catalyst as the typical mercury catalysts exhibit a much more vertical (hockey stick-like) viscosity build when the activation temperature is achieved.

Figure 6:
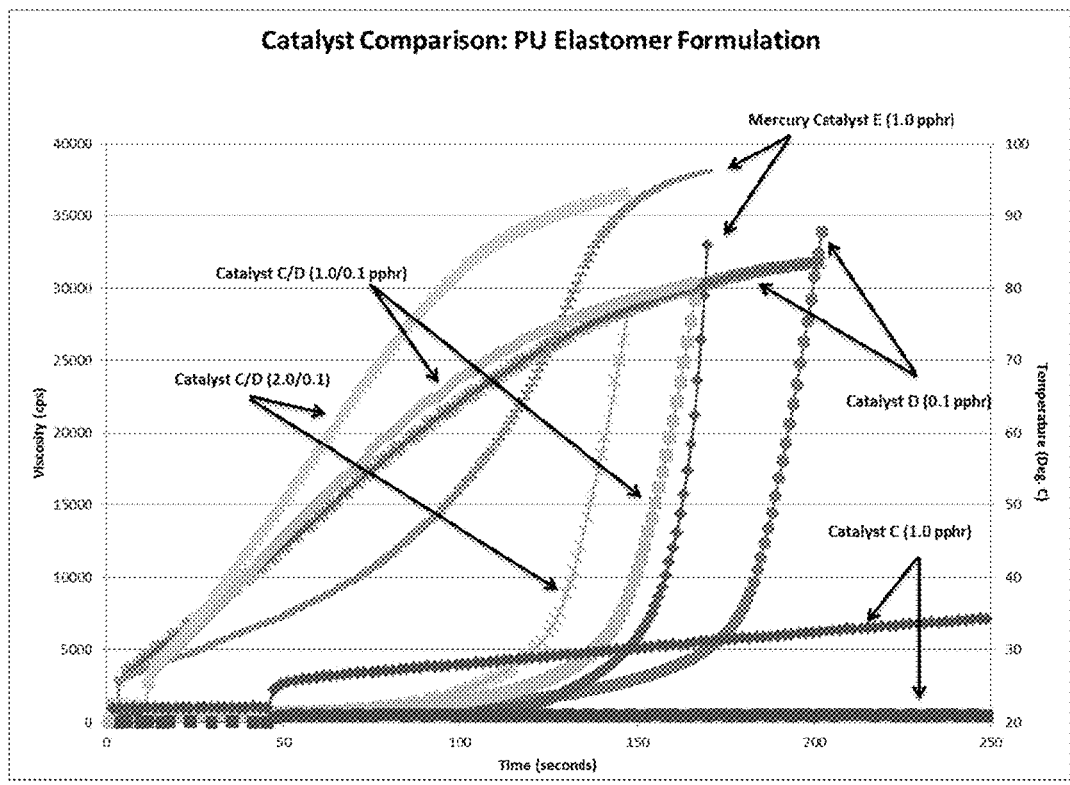
FIG. 6 is a graph comparing viscosity build in elastomer foam formulation with different catalysts.

The reaction profiles of catalysts C, D, and C/D versus catalyst E in the PU elastomer formulation are shown in FIG. 6. Catalyst C was very slow to build viscosity at 1.0 pphr (22 min to reach 1500 cps and 60° C.). Catalyst C/D at 1.0/0.1 pphr builds viscosity similarly to that of catalyst E under cold cure conditions. The noticeable difference in this case is with the exotherm, where Catalyst E provides a sigmoidal temperature curve vs. the parabolic curve of catalyst C/D. Also apparent in this graph is the impact of use level of catalyst D on the latency and subsequent cure rate of catalyst C. The addition of 0.1 pphr catalyst D to the elastomer resin containing 1.0 pphr catalyst C provides a marked increase in reactivity. Increasing the amount of catalyst C to 2.0 pphr and maintaining the level of catalyst D at 0.1 pphr provides a slightly more rapid increase in exotherm while retaining delayed viscosity build.

Both catalyst E and the co-catalyst system C/D achieve 25,000 cps viscosity in approximately the same time frame, and provide comparable green strength when compared at the conclusion of the experiment (~30 seconds after reaching 25,000 cps).

After observing the effect of catalyst D on catalyst C, an alternatively formulated catalyst was examined, utilizing both catalysts C and D, noted as catalyst F, rather than adding each as a separate entity. Three different levels of catalyst D were investigated where the composition would be similar to that of a co-catalyst D at 0.05, 0.1, and 0.2 pphr with a corresponding use level of 1.0 pphr catalyst C. Each is noted in FIG. 7 as catalyst F1, F2, and F3, respectively.

Figure 7:
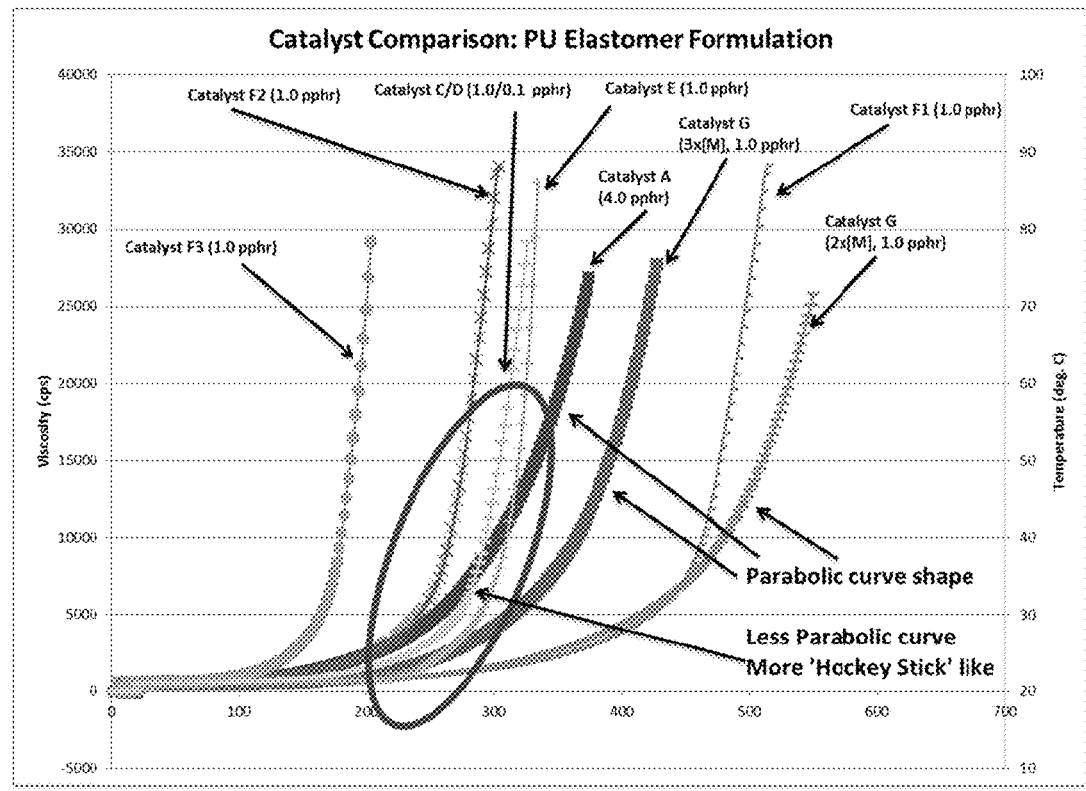
FIG. 7 is a graph comparing viscosity build in elastomer foam formulation with different catalysts.

FIG. 7 shows the effect of catalyst F on the cure rate in the PU elastomer formulation (Table 3). The formulated catalyst (F2) appears to build viscosity at a faster rate than the co-catalyst composition (catalyst C/D at 1.0/0.1 pphr) and both provide viscosity curves that are much less parabolic in nature (in this formulation), resembling the viscosity curve of catalyst G. The composition represented as catalyst F2 provides extended delay with a near 'hockey-stick' type viscosity curve. Catalyst E is still faster than catalyst F on the back end, apparent through observation of the distance between data points as the viscosity builds, resulting in slightly less rapid end-cure.

Catalyst compositions having an increase in concentration of the active metal content were also evaluated. This simple modification resulted in a tremendous increase in reactivity and viscosity build, where catalyst G at 1.0 pphr was similar to that of catalyst A at higher use level. This reactivity level is in the range of 2-4 pphr catalyst A and the viscosity curve is still parabolic, resembling that of catalyst A, independent of formulation.

Physical testing was also conducted to compare the hardness, tensile strength, elongation, and tear strength of parts made from the representative PU elastomer formulation containing the mercury based catalyst E and the non-mercury catalyst C/D.

The elastomeric plaque molds were prepared by mixing the resin on a drill press at 3500 rpm. The resin was then poured into an isothermal (61° C.) water jacketed mold with dimensions of 304.8 mm×304.8 mm×6.35 mm. Demold time was 30 min. The targeted density for plaque molds prepared with the PU elastomer formulation was 1100 Kg/m$^3$ (69 pcf). Shorter demold time would have sufficed for both as each provides a cold cure viscosity of 25,000 cps within 5 minutes, but to ensure consistency when testing a variety of catalysts at multiple levels, the demold time was extended.

TABLE 8

Physical Properties of Elastomeric Plaque Molds.

| Ex. | Catalyst | Tensile Strength Fmax (Mpa)* | Elongation (%)* | Tear Strength (MPa)** | Shore A | Asker C | Shore D | Density (Kg/m$^3$) |
|---|---|---|---|---|---|---|---|---|
| 17 | G (1.0 pphr) | 3.49 | 63.88 | 0.7 | 74 | 83 | 25 | 1070 (66.8 pcf) |
| 18 | C/D (1.0/0.1 Pphr) | 3.7 | 70.27 | 0.55 | 72 | 83 | 24 | 1050 (65.5 pcf) |

*ASTM D-412 "Die A"
**ASTM D-624 "Type C Die"

As can be seen in Table 8, the physical properties of the elastomers were comparable for both catalysts. Catalyst E provides slightly better tensile and tear strength, with catalyst C/D providing slightly better elongation.

Reactivity and physical properties are comparable for catalyst C/D and catalyst E. It is well known that in low water systems Hg-based catalysts do not promote the reaction between water and isocyanate. This selectivity allows for the production of non-cellular PU parts with non-porous surfaces. We compared catalyst E to catalyst C and catalyst C/D in the PU foam formulation B to compare reactivity/selectivity in the presence of water.

Figure 8:
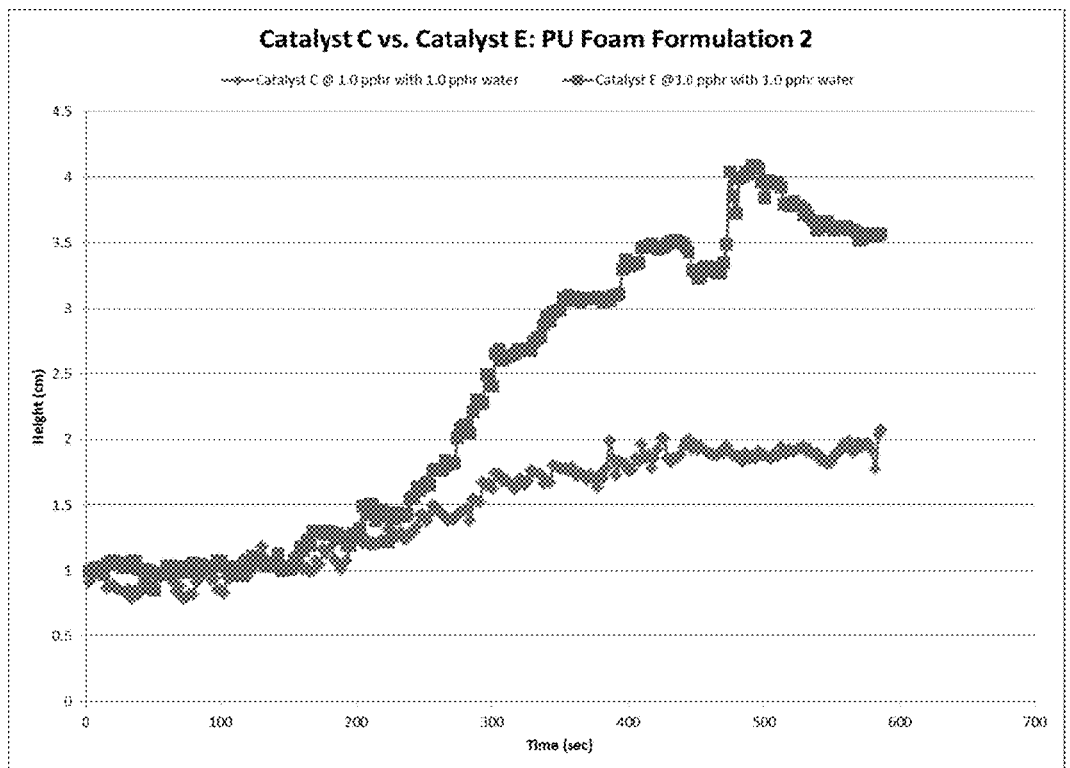
FIG. 8 is a graph comparing rise height of foam formulations employing different catalysts.

FIG. 8 shows the foam rise height for PU foam formulation B containing 1 pphr water with each of catalyst E and catalyst C. Even in the presence of water, which typically provides an intense exothermic reaction in the absence of catalyst, catalyst C does not appear to substantially impact the foam rise height. The absence of heat is likely a factor in the case of catalyst C and performance in a heated mold could potentially show different reactivity, however this result provided evidence to move forward and look at the C/D catalyst combination.

Figure 9:
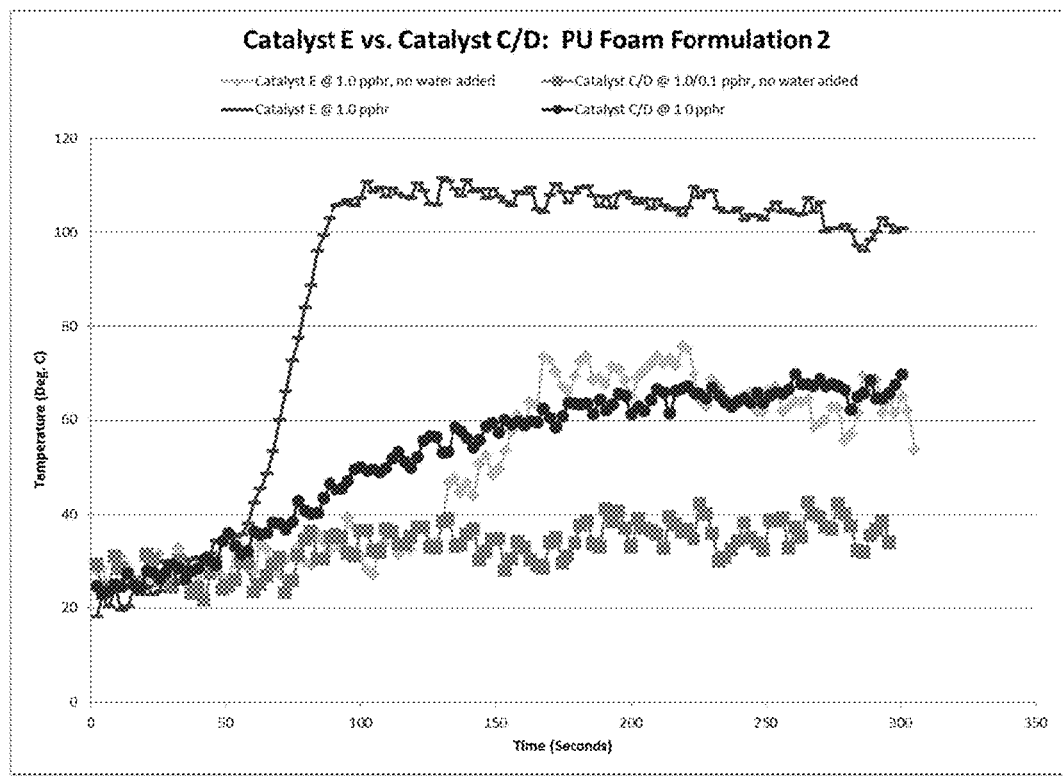
FIG. 9 is a graph showing the effect of water on catalysis for foam formulations with different catalysts.

FIG. 9 shows exotherm data for both catalyst E and catalyst C/D in the same foam formulation. Each catalyst was examined in triplicate (data was averaged to provide one curve per catalyst) with 1.0 pphr water added to the formulation, and also including data for the system without water containing each catalyst. Catalyst E reaches an exotherm temperature of approximately 75° C., without the addition of water, whereas catalyst C/D reaches a maximum temperature of only 42° C. in the absence of water. With the addition of 1.0 pphr water the exotherm for catalyst E is expedited by 100 seconds reaching 120° C. providing relatively cured foam within 500 seconds. Foams made using catalyst C/D did show an increase in exotherm, however much less pronounced than that of catalyst E, reaching activation temperature of >70° C. within 300 seconds. The foams made with catalyst C/D were placed in an oven at ~100° C. and were tack free (surface cured) in less than 5 minutes. The foams made with catalyst E did not require external heat to cure the surface.

Figure 10:
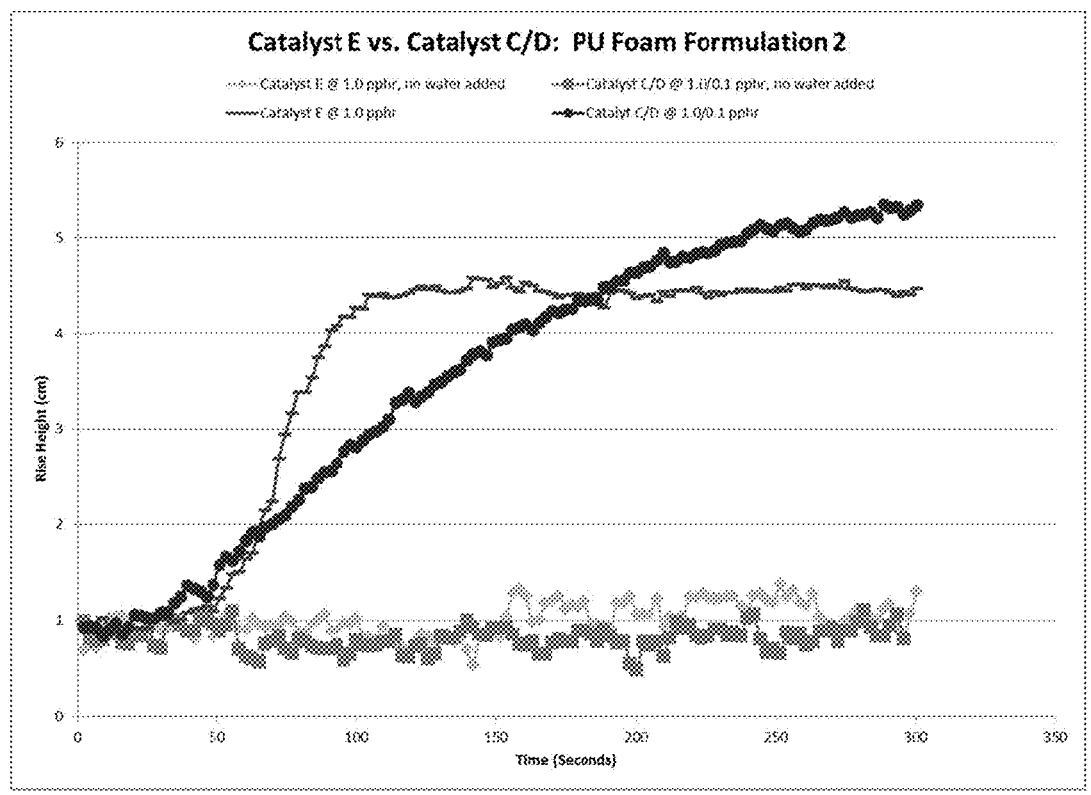
FIG. 10 is a graph showing the effect of water on catalysis for foam formulations with different catalysts.

The rise height of the foams was compared in FIG. 10 and it was found that in the absence of water the rise profile of the elastomer is similar regardless of catalyst. In the presence of water, blowing will occur regardless of catalyst, resulting in the foam rising. Foams made with either catalyst achieved approximately the same height, however catalyst E plateaued as it was quick to cure the foam throughout within the 350 second test time. The foam made with catalyst C/D continued to rise with very little settling (structurally stable) prior to being placed in the oven. The foams were rested for a 24 hour period (typical of slab and visco-elastic type foams) and then cut.

On examination of the cut foams it was evident that catalyst E was not a suitable catalyst for this specific application, however, catalyst C/D could be, providing typical foam made with PU foam formulation B. Catalyst E cured too quickly providing relatively large voids in the bottom of the foam, whereas catalyst C/D provided uniform cells with no voids within the foam.

The exotherm data is more indicative of the water reactivity than is the rise height data; however, the latter does indicate that other PU application areas may benefit from catalysts such as catalyst C/D.

Embodiments of the technology have been described above and modifications and alterations may occur to others upon the reading and understanding of this specification. The claims as follows are intended to include all modifications and alterations insofar as they come within the scope of the claims or the equivalent thereof.

What is claimed is:

1. A method for forming a foam comprising:
   (i) combining:
      a) at least one polyol;
      b) at least one isocyanate;
      c) a catalyst composition comprising a copper (II) compound dissolved in a solvent chosen from a dialkyl sulfoxide, an N,N-dialkylalkanoamides, a phosphonate, an aromatic compound, an ether compound, or an organic carbonate;
      d) at least one surfactant to form a mixture; and
   (ii) curing the mixture of (i).

2. The method of claim 1, where the copper (II) compound comprises copper (II) coordinated to a ligand chosen from a carboxylate, a diketonate, a salicylate, an organic salt, a halide, or a combination of two or more thereof.

3. The method of claim 1, where the catalyst composition comprises (Cu(II)(acac)$_2$).

4. The method of claim 3, where the solvent comprises DMSO.

5. The method of claim 1, where the catalyst composition comprises a co-diluent chosen from a fatty acid, a vegetable oil, or a combination thereof.

6. The method of claim 1, wherein the catalyst composition comprises two or more Cu(II) salts.

7. The method of claim 1, wherein the catalyst composition comprises Cu(II)(acac)$_2$ and Cu(II)acetate$_2$.

8. The method of claim 1, where the mixture comprises a copper concentration of about 0.04 to about 10 parts per 100 parts polyol (pphr).

9. The method of claim 1, comprising a co-catalyst (c').

10. The method of claim 9, wherein the co-catalyst is chosen from a tertiary amine.

11. The method of claim 10, wherein the tertiary amine is chosen from triethylenediamine, 2-methyltriethylenediamine, N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylhexamethylenediamine, bis(2-dimethylaminoethyl)ether, dimethylethanolamine, dimethylisopropanolamine, dimethylaminoethoxyethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethyl aminopropyl)isopropanolamine, 3-quinuclidinol, N,N,N',N'-tetramethylguanidine, 1,3,5-tris(N,N-dimethylaminopropyl)hexahydro-S-triazine, 1,8-diazabicyclo[5.4.0]undecene-7, N-methyl-N'-(2-dimethylaminoethyl)piperazine, N,N'-dimetylpiperazine, dimethylcyclohexylamine, N-methylmorpholine, N-ethylmorpholine, 1-methylimidazole, 1,2-dimethylimidazole, 1-isobutyl-2-methylimidazole, 1-dimethylaminopropylimidazole, N,N-dimethyhexanolamine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, quinuclidine, 2-methylquinuclidine, or a combination of two or more thereof.

12. The method of claim 9, wherein the catalyst composition and the co-catalyst are added separately in part (i).

13. The method of claim 9, wherein the catalyst composition and the co-catalyst are part of a single composition.

14. The method of claim 9, wherein the co-catalyst is present in an amount of from about 0.1 to about 10% by weight of the catalyst composition.

15. The method of claim 1, further comprising combining a component (e) with components (a)-(d), where component (e) is chosen from a blowing agent, a chain extender, a crosslinker, a filler, a reinforcement, a pigment, a tint, a dye, a colorant, a flame retardant, an antioxidant, an antiozonant, a UV stabilizer, an anti-static agent, a biocide, a biostat, or a combination or two or more thereof.

16. The method of claim 1, wherein step (i) comprises frothing components (a)-(d) to form a frothed mixture.

* * * * *